(12) United States Patent
Yeum

(10) Patent No.: US 11,164,305 B2
(45) Date of Patent: Nov. 2, 2021

(54) DEVICE FOR INSPECTING DISPLAY DEVICE AND INSPECTING METHOD THEREOF

(71) Applicant: SAMSUNG DISPLAY CO., LTD., Yongin-si (KR)

(72) Inventor: Jong-Hoon Yeum, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 197 days.

(21) Appl. No.: 16/665,093

(22) Filed: Oct. 28, 2019

(65) Prior Publication Data
US 2020/0134802 A1 Apr. 30, 2020

(30) Foreign Application Priority Data
Oct. 30, 2018 (KR) .................. 10-2018-0131281

(51) Int. Cl.
*H04N 5/372* (2011.01)
*G06T 7/62* (2017.01)
*G06T 7/50* (2017.01)
*G06T 7/00* (2017.01)

(52) U.S. Cl.
CPC .............. *G06T 7/001* (2013.01); *G06T 7/50* (2017.01); *G06T 7/62* (2017.01); *H04N 5/372* (2013.01)

(58) Field of Classification Search
CPC .. G06T 7/001; G06T 7/62; G06T 7/50; H04N 5/372

USPC .......................................................... 348/92
See application file for complete search history.

(56) References Cited

FOREIGN PATENT DOCUMENTS

| JP | 2006-023296 A | 1/2006 |
|---|---|---|
| KR | 10-2016-0041313 A | 4/2016 |
| KR | 10-2016-0126905 A | 11/2016 |
| KR | 10-2018-0058254 A | 6/2018 |

OTHER PUBLICATIONS

D. Roylance, "Introduction to Fracture Mechanics", Department of Materials Science and Engineering, Massachusetts Institute of Technology, 2001, pp. 1-17.

*Primary Examiner* — Jae N Noh
(74) *Attorney, Agent, or Firm* — Kile Park Reed & Houtteman PLLC

(57) ABSTRACT

A device for inspecting a display device includes a camera to photograph a substrate and generate image information, a pixel value setter to set pixel values corresponding to respective luminances of a plurality of pixels from the image information, and to detect a crack region based on the pixel values, a stress calculator to calculate a critical stress of a crack included in the crack region, and a determiner to check whether the critical stress is equal to or greater than a first threshold value and to determine whether the substrate has defects. The stress calculator calculates a critical stress of the substrate by using fracture toughness, a shape factor, and a crack depth. The shape factor is set to increase as a compressive stress of the substrate increases.

20 Claims, 10 Drawing Sheets

- Slight cracks
- Small cracks
- Moderate to big cracks

DEVICE FOR INSPECTING DISPLAY DEVICE AND INSPECTING METHOD THEREOF

CROSS-REFERENCE TO RELATED APPLICATION

Korean Patent Application No. 10-2018-0131281, filed on Oct. 30, 2018, in the Korean Intellectual Property Office, and entitled: "Device for Inspecting Display Device and Inspecting Method Thereof," is incorporated by reference herein in its entirety.

BACKGROUND

1. Field

Embodiments relate to a device for inspecting a display device and an inspecting method thereof. More particularly, the present invention relates to a device for inspecting a substrate used to a display device and an inspecting method thereof.

2. Description of the Related Art

A display device includes a plurality of pixels for displaying images and a plurality of signal lines connected thereto. A plurality of pixels and signal lines are provided on a base substrate. A protective substrate is also provided on a plurality of pixels and signal lines to protect the display device from external impacts or foreign particles.

SUMMARY

Embodiments are directed to a device for inspecting a display device, the device including a camera to photograph a substrate and generate image information, a pixel value setter to set pixel values corresponding to respective luminances of a plurality of pixels from the image information, and to detect a crack region based on the pixel values, a stress calculator to calculate a critical stress of a crack included in the crack region, and a determiner to check whether the critical stress is equal to or greater than a first threshold value and to determine whether the substrate has defects. The stress calculator calculates a critical stress of the substrate by using fracture toughness, a shape factor, and a crack depth. The shape factor is set to increase as a compressive stress of the substrate increases.

The shape factor may be greater than 1.1 and equal to or less than 1.3.

When the substrate is a tempered glass substrate, the shape factor may be 1.2.

The device for inspecting a display device may further include an image storage unit for storing the image information.

The camera may include a CCD camera including a predetermined number of pixels.

The plurality of pixels for which the pixel value setter sets pixel values may correspond to the predetermined number of pixels included in the camera.

The pixel value setter may assign a first value to a pixel having luminance that is equal to or greater than a reference luminance, assign a second value to a pixel having luminance that is less than the reference luminance, and categorizes a pixel to which the second value is set to be the crack region.

The pixel value setter may categorize a length in which pixels having the pixel value of the second value continue in one direction as being a crack length and may categorize a portion in which pixels having the pixel value of the second value continue on respective sides in the one direction as being a range of a lateral crack. The stress calculator may determine a crack depth corresponding to at least one of the crack length and the range of a lateral crack.

The stress calculator may determine the crack depth from a lookup table that provides a crack depth corresponding to a crack length and a range of a lateral crack.

The pixel value setter may set pixel values to the pixels, compare pixel values for respective lines that are a summation of the pixel values for respective rows or columns of pixels with a reference pixel value, and detects the crack region.

Embodiments are also directed to a method for inspecting a display device, the method including photographing a substrate to generate image information, setting pixel values corresponding to respective luminances of a plurality of pixels in the image information, detecting a crack region based on the pixel values, and detecting a crack length for the crack region to continue in one direction, determining a crack depth corresponding to the crack length, calculating a critical stress of the substrate based on the crack depth, and checking whether the critical stress is equal to or greater than a first threshold value to determine whether the substrate has defects.

The critical stress of the substrate may be calculated by using fracture toughness, a shape factor, and the crack depth. The shape factor may increase as a compressive stress of the substrate increases.

When the substrate is a tempered glass substrate, the shape factor may be 1.2.

The method for inspecting a display device further include storing the image information.

The substrate may be photographed by a CCD camera including a predetermined number of pixels.

The plurality of pixels to which the pixel value is set may correspond to a plurality of pixels included in the CCD camera.

A first value may be set to a pixel having a luminance that is equal to or greater than a reference luminance, and a second value is set to a pixel having a luminance that is less than the reference luminance to set pixel values corresponding to respective luminances of the pixels.

A pixel to which the second value is set may be detected as the crack region.

A length in which pixels having pixel values of the second value continue in one direction may be categorized to be the crack length.

The method for inspecting a display device may further include detecting a portion in which pixels having the pixel value of the second value continue on respective sides in the one direction to be a range of a lateral crack. The crack depth may be determined corresponding to at least one of the crack length and the range of the lateral crack.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
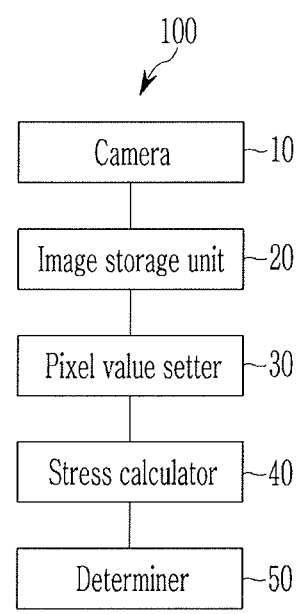
FIG. 1 illustrates a block diagram of a device for inspecting a display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

A device for inspecting a display device according to an exemplary embodiment will now be described with reference to FIG. 1

FIG. 1 illustrates a block diagram of a device for inspecting a display device according to an exemplary embodiment.

Referring to FIG. 1, an inspecting device 100 includes a camera 10, an image storage unit 20, a pixel value setter 30, a stress calculator 40, and a determiner 50.

The camera 10 photographs a substrate used in the display device in a plane view to generate image information. The substrate used in the display device may include a base substrate on which a plurality of pixels are arranged, and a protective substrate (or a window) for covering a plurality of pixels. The substrate may be made of glass or plastic. The case in which the substrate is made of glass will now be described. The camera 10 may be a charge coupled device (CCD) camera including a predetermined number of a plurality of pixels. A plurality of pixels included in the camera 10 may be arranged in a matrix form.

The image storage unit 20 may store image information of the substrate generated by the camera 10.

The pixel value setter 30 sets pixel values corresponding to luminance of a plurality of pixels from the image information stored in the image storage unit 20. The plurality of pixels for which image information is stored may correspond to the plurality of pixels included in the camera 10. The pixel value setter 30 may analyze the image information to set a first value to pixels having a luminance that is equal to or greater than a reference luminance and to set a second value to pixels having a luminance that is less than the reference luminance. The first value may indicate a normal region having no crack, and the second value may indicate a crack region having one or more cracks. For example, the first value may be 1, and the second value may be 0. The reference luminance may be luminance with a predetermined level to enable detection of the crack region. The pixel value setter 30 may categorize the pixels to which the second value is set as being a crack region.

According to an exemplary embodiment, the pixel value setter 30 may set pixel values to a plurality of pixels and summate the pixel values for respective lines (rows or columns) of the pixels. A row or column of pixels in which the summated pixel value is equal to or greater than the reference pixel value may indicate a normal region having no cracks. A row or column of pixels in which the summated pixel value is less than the reference pixel value may be categorized as a crack region having cracks. The reference pixel value may be a predetermined value so as to enable the detection of a crack region.

The stress calculator 40 may calculate a critical stress of the substrate based on the pixel value set according to image information. The stress calculator 40 may calculate the critical stress of the substrate by using fracture toughness, a shape factor, and a crack depth as expressed in Equation 1.

$$\sigma = \frac{1}{Y} \frac{K_{IC}}{\sqrt{c}} \qquad \text{(Equation 1)}$$

Here, σ is a critical stress, $K_{IC}$ is fracture toughness, Y is a shape factor, and c is a crack depth. The fracture toughness $K_{IC}$ may be predetermined according to a material of the substrate. The shape factor Y may be predetermined according to a compressive stress of the substrate. The crack depth c may be set corresponding to a length or a size of the crack region indicated by the pixel value. In some implementations, the user may directly measure the crack depth of the crack region indicated from the pixel value with a microscope to provide a measured crack depth to the stress calculator 40.

The determiner 50 may check whether the critical stress of the calculated substrate is equal to or greater than a first threshold value to determine whether the substrate is defective. When the critical stress of the substrate is equal to or greater than the first threshold value, the substrate may be determined to be a good substrate that has no cracks or that has slight cracks that do not influence functions of the display device. When the critical stress of the substrate is less than the first threshold value, the substrate may be determined to be a substrate that has small cracks that could influence the functions of the display device. According to an exemplary embodiment, the determiner 50 may further check whether the calculated critical stress of the substrate is less than a second threshold value, which is less than the first threshold value. When the critical stress of the substrate is less than the second threshold value, the substrate may be determined to be a defective substrate that has big cracks that could substantially influence the functions of the display device.

A method for inspecting a display device by use of an inspecting device will now be described with reference to FIG. 1 and FIG. 2 to FIG. 9.

Figure 2:
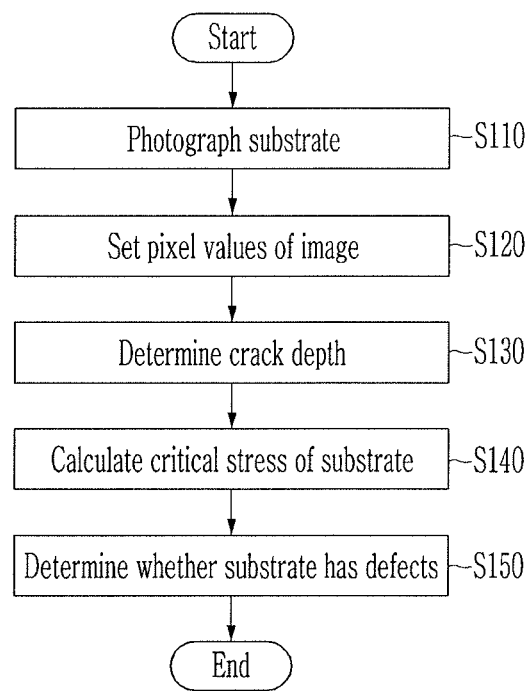
FIG. 2 illustrates a flowchart of a method for inspecting a display device according to an exemplary embodiment.

FIG. 2 illustrates a flowchart of a method for inspecting a display device according to an exemplary embodiment.

Referring to FIG. 2, a camera 10 may photograph a substrate (S110). The camera 10 may photograph the substrate in a plane view to generate image information. The camera 10 may be a CCD camera including a plurality of pixels. The camera 10 may transmit image information to the image storage unit 20, and the image storage unit 20 may store the image information.

The pixel value setter 30 may analyze the image information to set pixel values of a plurality of pixels forming the image of the substrate (S120). The pixel value setter 30 may set a first value (e.g., 1) to a pixel having luminance that is equal to or greater than a reference luminance, and may set a second value (e.g., 0) to a pixel having luminance that is less than the reference luminance. A crack region has lower transmittance or reflectivity than a normal region, so luminance of a crack region is less than luminance of a normal region. Therefore, the pixel value setter 30 may detect luminance of a plurality of pixels from the image of the substrate to detect the crack region as being a region with relatively low luminance. This will now be described with reference to FIG. 3A, FIG. 3B, and FIG. 4.

Figure 3A:
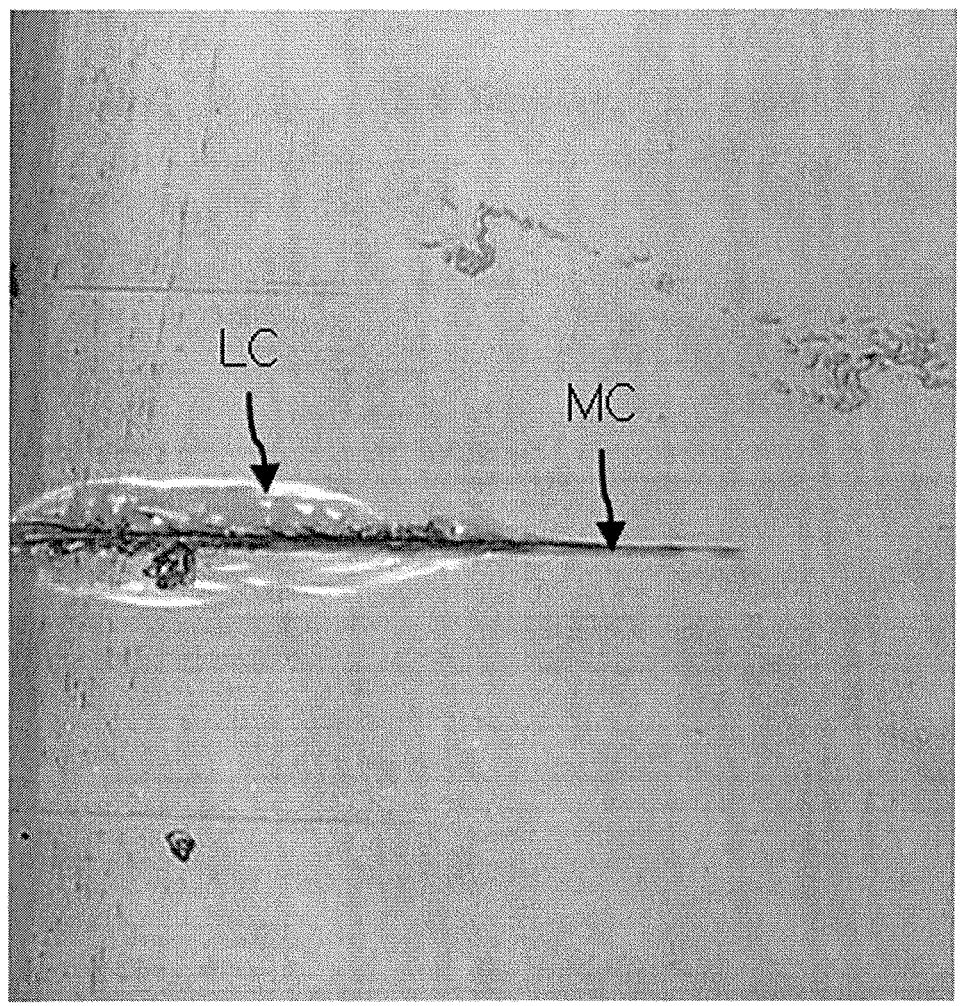
FIG. 3A illustrates part of an image including a crack region in a substrate.
Figure 3B:
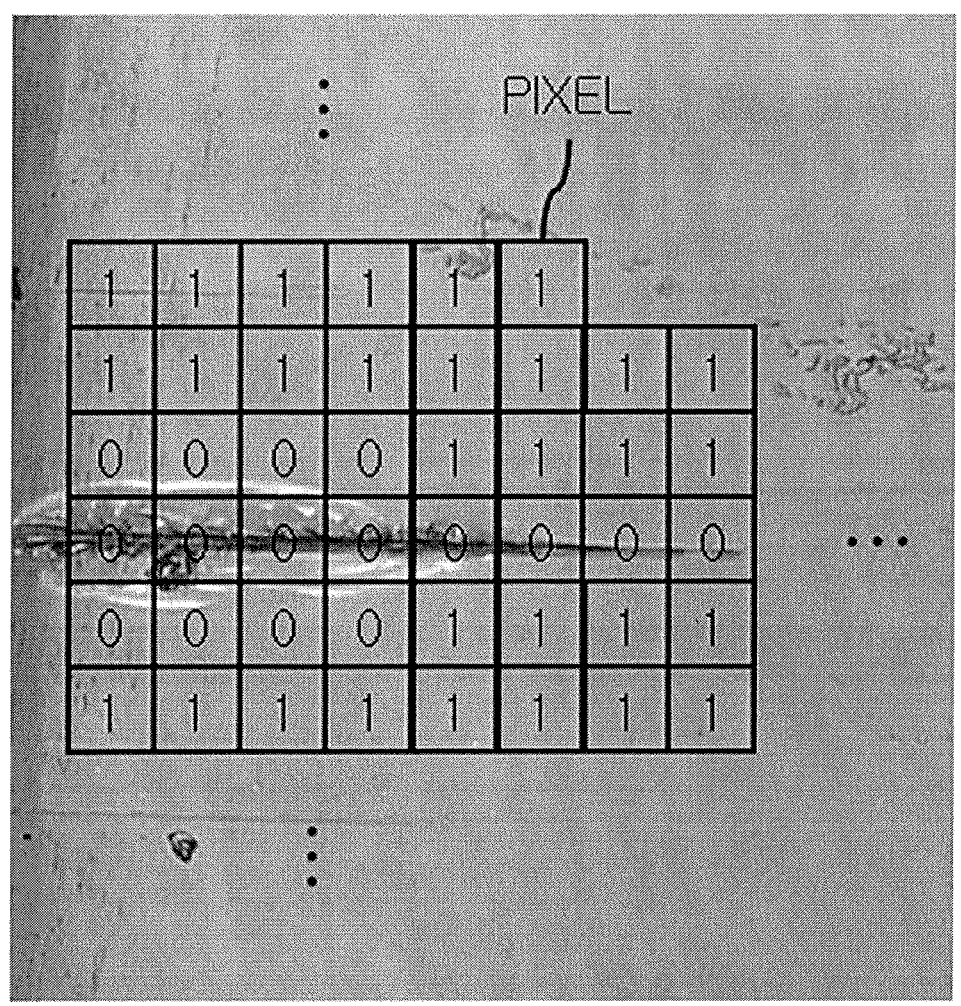
FIG. 3B shows an example of setting a pixel value corresponding to an image of a substrate.

FIG. 3A illustrates a part of an image of a substrate including a crack region, and FIG. 3B illustrates an example of setting a pixel value corresponding to the image of the substrate.

Referring to FIG. 3A, cracks generated in the substrate may include median cracks MC and lateral cracks LC. A median crack MC is a crack that extends in one direction in a plane view and extends in a direction that is substantially perpendicular to a surface of the substrate. The length of the median crack MC extending in one direction is referred to as the crack length, and a length of the median crack MC extending in the direction that is perpendicular to the surface of the substrate is referred to as the crack depth. The lateral crack LC may extend on respective sides from the median crack MC. The critical stress of the substrate may be worse when the median crack MC and the lateral crack LC are both formed, compared to the case when the median crack MC is formed without the lateral crack LC.

Referring to FIG. 3B, the region in which the median crack MC and the lateral crack LC are formed has relative low luminance (i.e., a luminance lower than the reference luminance), so the pixel value setter 30 may set a second value (e.g., 0) to the pixels corresponding to the region in which the median crack MC and the lateral crack LC are formed. A region other than the above-noted region may have a luminance that is equal to or greater than the reference luminance, and the pixel value setter 30 may set a first value (e.g., 1) to the pixels corresponding to the region other than the crack region. A region configured with pixels having the pixel value of a second value is categorized as the crack region.

The pixel value setter 30 may detect a length in which the pixels having the pixel value of a second value extend in one direction. The detected length is referred to as the crack length of the median crack MC. The pixel value setter 30 may detect a portion in which the pixels having the pixel value of a second value on respective sides of a median crack MC are continuously provided. The detected region is referred to as a range of the lateral crack LC.

The pixel value setter 30 may set pixel values for a plurality of pixels and may sum the pixel values for the respective lines (rows or columns) of the pixels. The pixel value setter may detect the row or the column of the pixel of which the summed pixel values are less than the reference pixel value to be a crack region. This will now be described with reference to FIG. 4.

Figure 4:
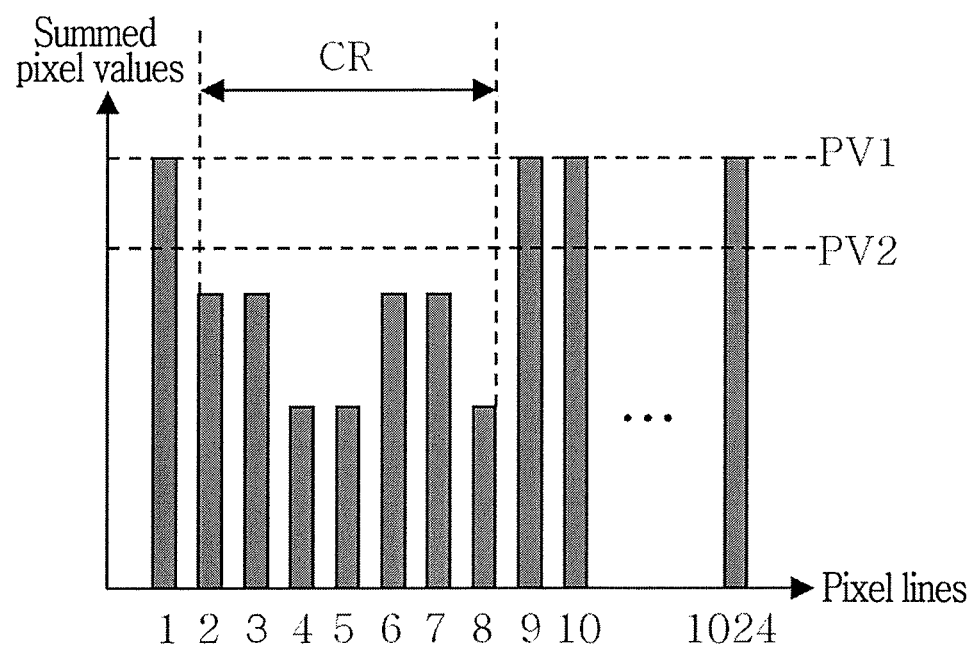
FIG. 4 illustrates an example of a summation of pixel values for respective pixel lines having summed pixel values for respective pixel lines.

FIG. 4 shows an example of a summation of pixel values for respective pixel lines having summed pixel values for respective rows or columns.

Referring to FIG. 4, the example in which pixel values are set to a plurality of pixels and the pixel values are summed for the respective lines is based on a plurality of pixels forming 1024 pixel lines. The pixel line in which the summed pixel values correspond to the first reference pixel value PV1 corresponds to the normal region having no cracks. The pixel line in which the summed pixel values are less than the first reference pixel value PV1 may include a crack region CR. According to an exemplary embodiment, the pixel line including the crack region CR may be detected with reference to a second reference pixel value PV2 that is less than the first reference pixel value PV1. The pixel row in which the summed pixel values are equal to or greater than the second reference pixel value PV2 may be considered to be the normal region having no cracks, and the pixel line in which the summed pixel values are less than the second reference pixel value PV2 may be considered to include the crack region CR.

Referring to FIG. 2, the stress calculator 40 may determine the crack depth based on the crack length (S130). The crack depth generally increases as the crack length of a median crack increases and as the range of a lateral crack increases. The above-noted size relationship may differ according to a characteristic of the material of the substrate. The crack depth corresponding to at least one of the crack length and the range of the lateral crack may be predetermined in consideration of the characteristic of the material of the substrate. The relationship of the crack depth to a crack length and relationship of the crack depth to a range of a lateral crack may be acquired through testing. A lookup table relating the crack depth to the crack length and the range of the lateral crack may be generated based on the test result. The stress calculator 40 may include the lookup table and may acquire the crack depth corresponding to at least one of the crack length and the range of the lateral crack, as detected from the pixel value, from the lookup table.

The crack depth of the pixel line including the crack region indicated by the pixel value as shown in FIG. 3B or as the crack region indicated by the summed pixel value as shown in FIG. 4 may be directly measured by the user by using a microscope. The measured crack depth may be input to the stress calculator 40.

The stress calculator 40 calculates the critical stress of the substrate by using the fracture toughness, the shape factor, and the crack depth (S140). For example, the stress calculator 40 may calculate the critical stress of the crack included in the crack region by using Equation 1 described with reference to FIG. 1. The fracture toughness may be predetermined according to the material of the substrate. The crack depth may be acquired from the lookup table corresponding to the crack length and the range of the lateral crack or may be set with a value input by the user. The shape factor may be set according to the compressive stress of the substrate.

The shape factor may be set to be larger as the compressive stress of the substrate increases. A relationship between the shape factor and the compressive stress of the substrate is tested with three kinds of substrates, and a result thereof will be described with reference to FIG. 5 to FIG. 7.

Figure 5:
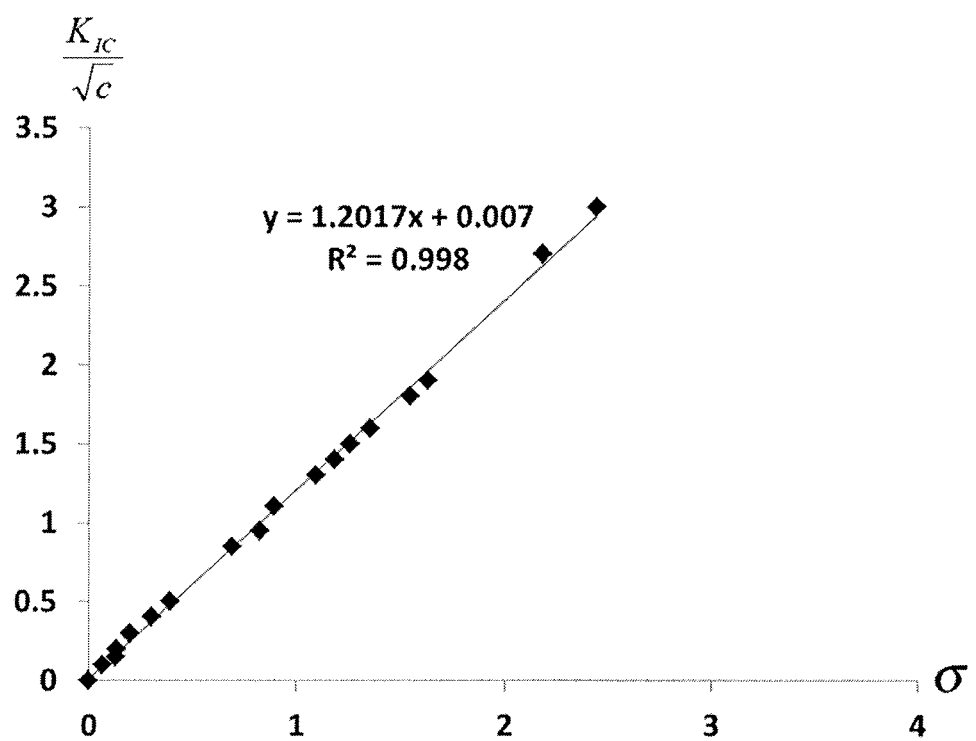
FIG. 5 to FIG. 7 illustrate an example for testing shape factors of three kinds of substrates having different compressive stresses.
Figure 6:
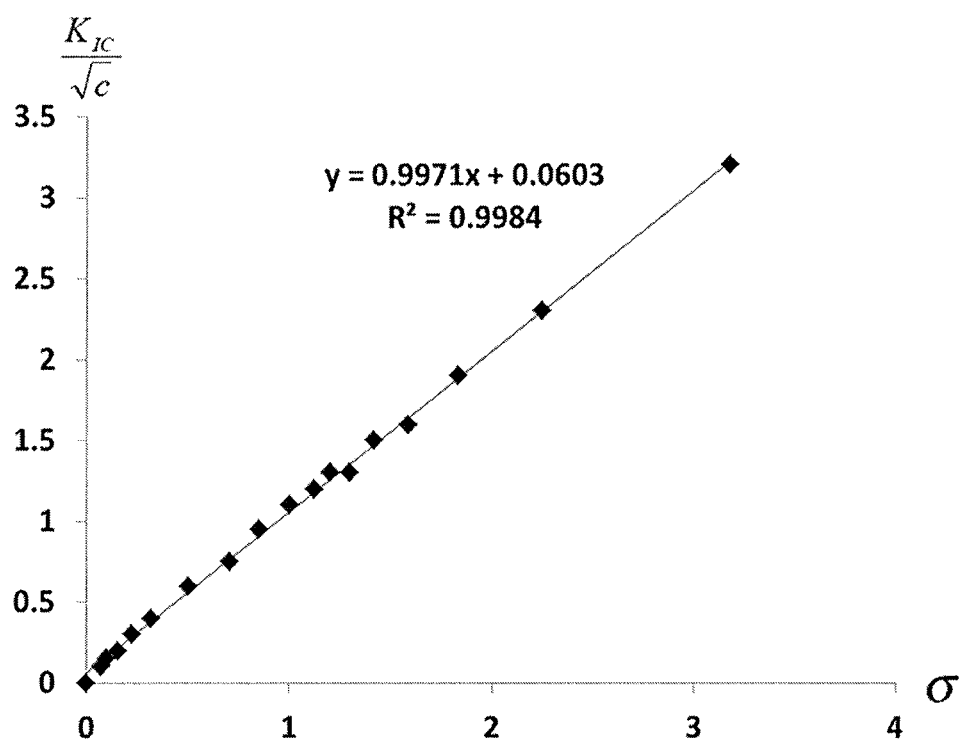
Figure 7:
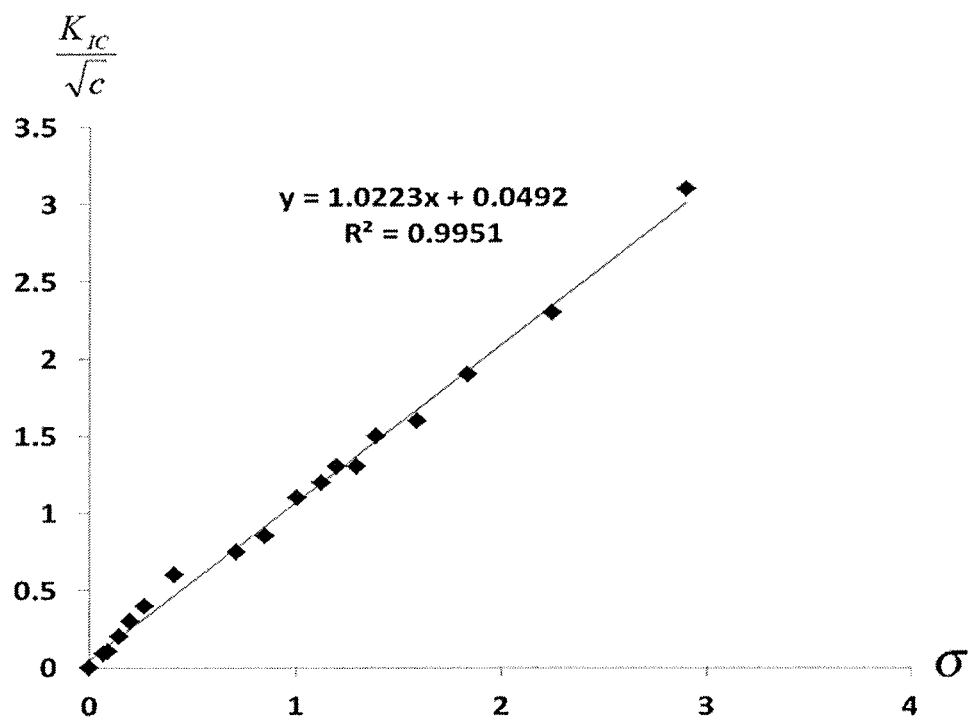

FIG. 5 to FIG. 7 show examples for testing shape factors of three kinds of substrates having different compressive stresses. FIG. 5 shows a result of testing the shape factor of a first glass substrate with compressive stress of 1000 MPa and fracture toughness of 0.71. FIG. 6 shows a result of testing the shape factor of a second glass substrate with compressive stress of 700 MP to 800 MPa and fracture toughness of 0.71. FIG. 7 shows a result of testing the shape factor of a third glass substrate with compressive stress of 700 MPa to 800 MPa and fracture toughness of 0.69. In the graph shown with reference to FIG. 5 to FIG. 7, the x axis represents the critical stress σ, and the y axis indicates the ratio $$\frac{K_{IC}}{\sqrt{c}}$$

of the fracture toughness $K_{IC}$ to a square root of the crack depth c. In FIG. 5 to FIG. 7, a slope of the graph determines the shape factor.

As can be determined in FIG. 5, the shape factor of the first glass substrate is about 1.2. As can be determined from FIGS. 6 and 7, the shape factors of the second and the third glass substrate are about 1.0.

The general compressive stress of the glass substrate is about 700 MPa to 800 MPa. The shape factor of 1.0 may be applied to the glass substrate. On the other hand, the compressive stress of a tempered glass substrate with excellent compressive stress may be equal to or greater than about 1000 MPa. In this case, it is appropriate to apply the shape factor of about 1.2 to the tempered glass substrate. In general, a shape factor of 1.1 to 1.3 may be applied according to the compressive stress of the tempered glass substrate.

Referring to FIG. 2, the determiner 50 checks whether the calculated critical stress is equal to or greater than the first threshold value to determine whether the substrate can be considered as defective (S150). When the critical stress of the substrate is equal to or greater than the first threshold value, the substrate may be determined to be a good substrate that has no cracks or that has slight cracks that do not influence the functions of the display device. When the critical stress of the substrate is less than the first threshold value, the substrate may be determined to be a substrate that has cracks that could influence the functions of the display device. For example, the determiner 50 may determine the substrate with the critical stress that is equal to or greater than 100 MPa to be a good substrate, and it may determine the substrate with the critical stress that is less than 100 MPa to be a bad substrate. The determiner 50 may display the determination of whether the substrate has defects to a monitor so that the users may know.

Regarding the result of testing a defect rate of the substrate by calculating the critical stresses on a plurality of tempered glass substrates, the defect rate may be about 26% when the shape factor of 1.2 is applied, and the defect rate may be about 30% when the shape factor of 1.0 is applied. For example, when the shape factor of 1.0 is applied to the tempered glass substrate, an erroneous determination may be 4%. When the shape factor of 1.2 is applied to the tempered glass substrate, the erroneous determination of 4% may be accurately determined to be good substrates, and manufacturing yields of the substrate and the display device may be improved.

The critical stress of the substrate reduces as the crack region increases. This is because the substrate is weakened when many cracks are generated in the substrate. This will now be described according to an exemplary embodiment of FIG. 8 and FIG. 9.

Figure 8:
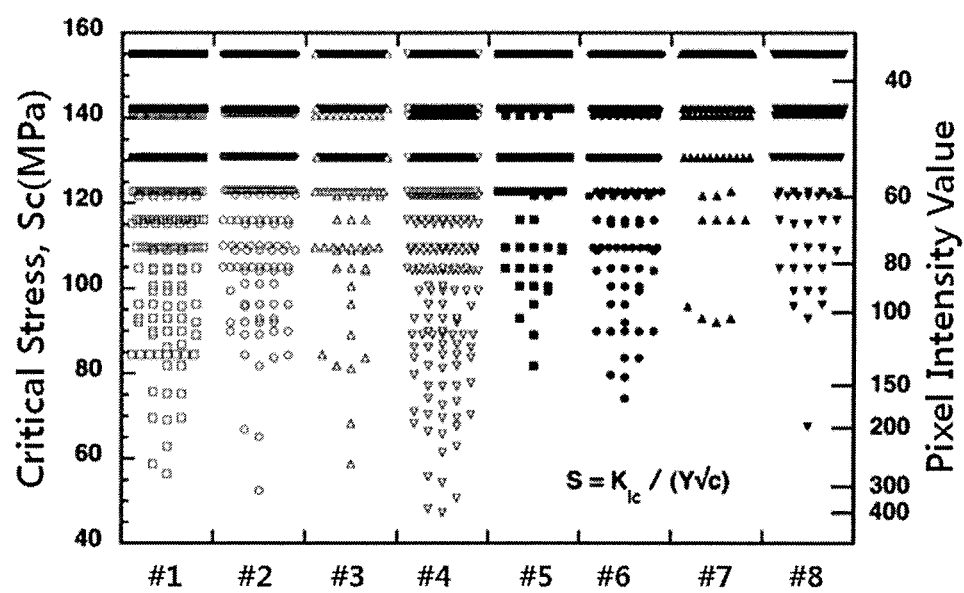
FIG. 8 illustrates an example of testing a relationship between a critical stress of a substrate and a pixel intensity value.

FIG. 8 shows an example of testing a relationship between a critical stress of a substrate and a pixel intensity value.

Referring to FIG. 8, test results acquired by measuring pixel intensity values and critical stresses on eight test substrates (#1 to #8) are shown. The pixel intensity values are obtained by providing values corresponding to the ratio of the region occupied by the crack region in a plurality of pixels. It is found that as the pixel intensity value increases, the critical stress of the substrate is reduced. For example, it is found that as the crack region increases, the critical stress of the substrate is reduced.

Figure 9:
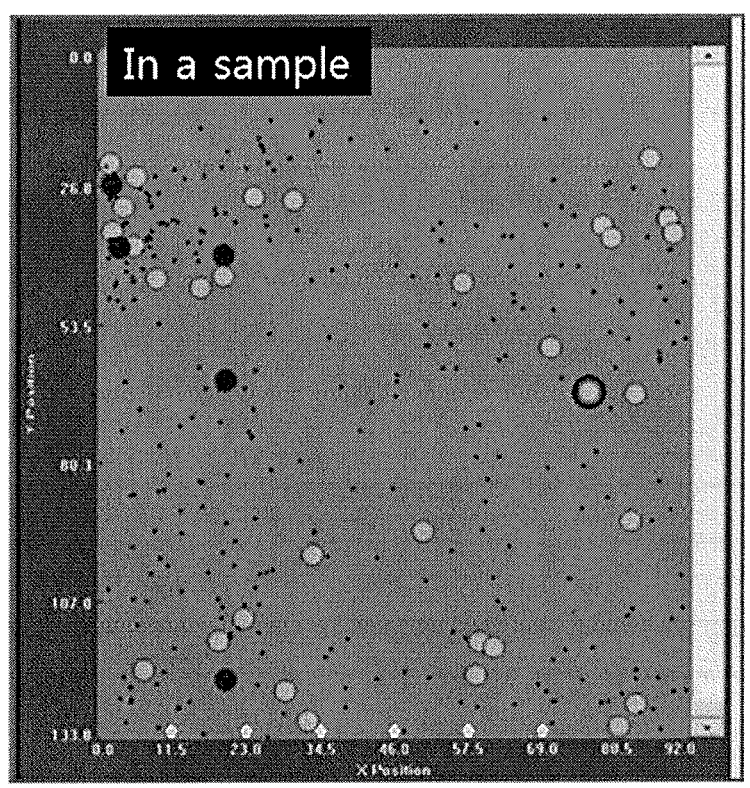
FIG. 9 illustrates a test example of detecting a crack existing in a substrate.

FIG. 9 shows a test example of detecting a crack existing in a substrate.

Referring to FIG. 9, the crack region may be detected by analyzing image information of the substrate and setting the pixel values corresponding to the respective luminance of a plurality of pixels. The crack region of the substrate may be distributed on a whole portion of the substrate. When the critical stresses are calculated for the respective detected crack regions, and the calculated critical stresses are compared to the first threshold value and the second threshold value, the crack region having a critical stress that is equal to or greater than the first threshold value may be marked as having slight cracks, the crack region having a critical stress that is less than the first threshold value and is equal to or greater than the second threshold value may be marked as having small cracks, and the crack region having a critical stress that is less than the second threshold value may be marked as having moderate to big cracks. The slight cracks may not influence the functions of the display device, and the substrate in which slight cracks are detected may be determined to be a good substrate. The small cracks and the moderate to big cracks may influence the display device, and a substrate having small cracks or moderate to big cracks may be determined to be a defective substrate.

By way of summation and review, substrates such as a base substrate or a protective substrate used for the display device may be made of glass or plastic. When the base substrate or the protective substrate has cracks, external moisture may permeate into the display device to deteriorate the reliability of components. Accordingly, the pixels of the display device may not emit light or may emit light in an erroneous way.

Recently developed flexible displays may be bent or folded while they are manufactured. When the substrate has cracks, there may be no issues in an earlier stage, but as time passes, small cracks may become bigger as the display device is bent or folded.

Embodiments provide a device for inspecting a display device for more accurately testing cracks on a substrate used to a display device, and an inspecting method thereof.

According to embodiments, cracks generated in a base substrate and in a protective substrate in the display area may be further accurately inspected, thereby improving the yield in manufacturing the display device.

Further, setting the pixel value, calculating the critical stress, and determining whether the substrate has defects after the substrate is photographed may be automated, thereby reducing the time for inspecting the cracks in the substrate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A device for inspecting a display device, the device comprising:
    a camera to photograph a substrate and generate image information;
    a pixel value setter to set pixel values corresponding to respective luminances of a plurality of pixels from the image information, and to detect a crack region based on the pixel values;

a stress calculator to calculate a critical stress of a crack included in the crack region; and a determiner to check whether the critical stress is equal to or greater than a first threshold value and to determine whether the substrate has defects, wherein:

the stress calculator calculates a critical stress of the substrate by using fracture toughness, a shape factor, and a crack depth, and the shape factor is set to increase as a compressive stress of the substrate increases.

2. The device for inspecting a display device as claimed in claim 1, wherein the shape factor is greater than 1.1 and equal to or less than 1.3.

3. The device for inspecting a display device as claimed in claim 1, wherein when the substrate is a tempered glass substrate, the shape factor is 1.2.

4. The device for inspecting a display device as claimed in claim 1, further comprising an image storage unit for storing the image information.

5. The device for inspecting a display device as claimed in claim 1, wherein the camera includes a CCD camera including a predetermined number of pixels.

6. The device for inspecting a display device as claimed in claim 5, wherein the plurality of pixels for which the pixel value setter sets pixel values corresponds to the predetermined number of pixels included in the camera.

7. The device for inspecting a display device as claimed in claim 1, wherein the pixel value setter sets a first value to a pixel having luminance that is equal to or greater than a reference luminance, sets a second value to a pixel having luminance that is less than the reference luminance, and categorizes a pixel to which the second value is set to be the crack region.

8. The device for inspecting a display device as claimed in claim 7, wherein the pixel value setter categorizes a length in which pixels having the pixel value of the second value continue in one direction as being a crack length, and categorizes a portion in which pixels having the pixel value of the second value continue on respective sides in the one direction as being a range of a lateral crack, and the stress calculator determines the crack depth corresponding to at least one of the crack length and the range of a lateral crack.

9. The device for inspecting a display device as claimed in claim 8, wherein the stress calculator determines the crack depth from a lookup table that provides a crack depth corresponding to a crack length and a range of a lateral crack.

10. The device for inspecting a display device as claimed in claim 1, wherein the pixel value setter sets pixel values to the pixels, compares a pixel values for respective lines that are a summation of the pixel values for respective rows or columns of pixels with a reference pixel value, and detects the crack region.

11. A method for inspecting a display device, the method comprising:

photographing a substrate to generate image information;

setting pixel values corresponding to respective luminances of a plurality of pixels in the image information;

detecting a crack region based on the pixel values, and detecting a crack length for the crack region to continue in one direction;

determining a crack depth corresponding to the crack length;

calculating a critical stress of the substrate based on the crack depth; and checking whether the critical stress is equal to or greater than a first threshold value to determine whether the substrate has defects.

12. The method for inspecting a display device as claimed in claim 11, wherein the critical stress of the substrate is calculated by using fracture toughness, a shape factor, and the crack depth, and the shape factor increases as a compressive stress of the substrate increases.

13. The method for inspecting a display device as claimed in claim 12, wherein when the substrate is a tempered glass substrate, the shape factor is 1.2.

14. The method for inspecting a display device as claimed in claim 11, further comprising storing the image information.

15. The method for inspecting a display device as claimed in claim 11, wherein the substrate is photographed by a CCD camera including a predetermined number of pixels.

16. The method for inspecting a display device as claimed in claim 15, wherein the plurality of pixels to which the pixel value is set correspond to a plurality of pixels included in the CCD camera.

17. The method for inspecting a display device as claimed in claim 11, wherein a first value is set to a pixel having a luminance that is equal to or greater than a reference luminance, and a second value is set to a pixel having a luminance that is less than the reference luminance to set pixel values corresponding to respective luminances of the pixels.

18. The method for inspecting a display device as claimed in claim 17, wherein a pixel to which the second value is set is detected as the crack region.

19. The method for inspecting a display device as claimed in claim 18, wherein a length in which pixels having pixel values of the second value continue in one direction is categorized to be the crack length.

20. The method for inspecting a display device as claimed in claim 19, further comprising detecting a portion in which pixels having the pixel value of the second value continue on respective sides in the one direction to be a range of a lateral crack, wherein the crack depth is determined corresponding to at least one of the crack length and the range of the lateral crack.

* * * * *